A. C. MILLER.
Seed-Dropper.
No. 17,440. Patented June 2, 1857.
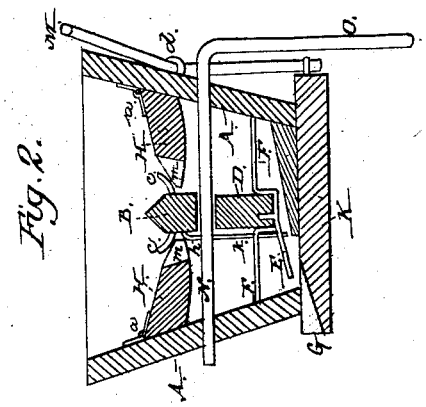
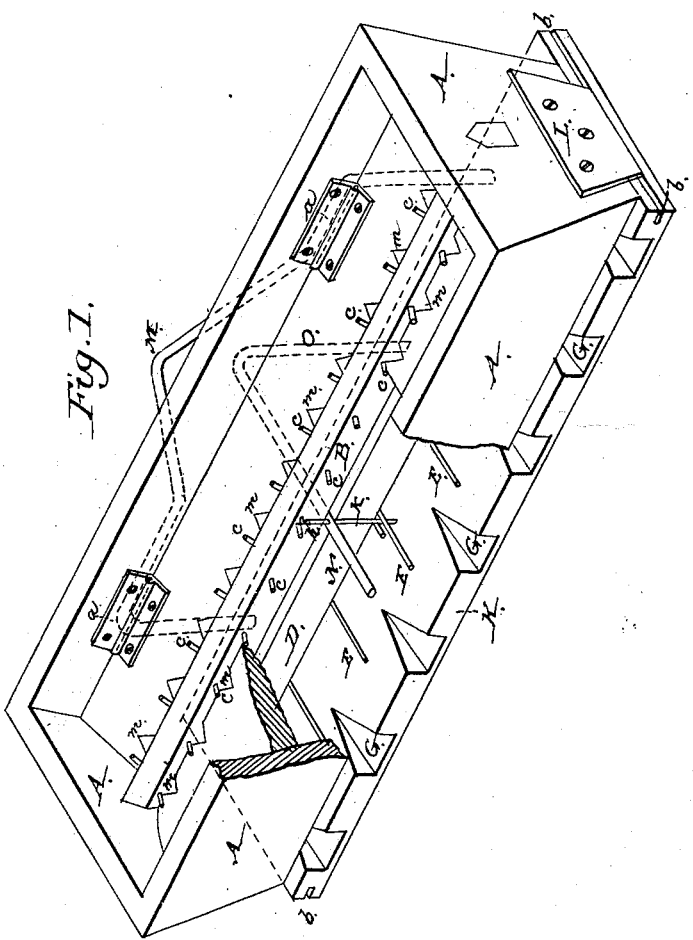

UNITED STATES PATENT OFFICE.

A. C. MILLER, OF MORGANTOWN, VIRGINIA.

IMPROVEMENT IN MACHINES FOR SOWING SEED BROADCAST.

Specification forming part of Letters Patent No. 17,440, dated June 2, 1857.

*To all whom it may concern:*

Be it known that I, A. C. MILLER, of Morgantown, in the county of Monongalia and State of Virginia, have invented certain new and useful Improvements in Machines for Sowing Seed Broadcast; and I do hereby declare that the following is a full, clear, and exact description thereof, reference being had to the accompanying drawings, in which—

Figure 1 represents a perspective view of the seed-box, one side thereof being represented as partly broken out to show the parts inside. Fig. 2 represents a vertical cross-section through the seed-box.

The nature of my invention consists in providing the seed-box of a sowing-machine with a peculiar kind of false bottom for the seed to rest upon, thus preventing the seed from bearing with its full weight on the seed-bar, while the seed drops through notches in said false bottom into the seed-box, and thence to the ground.

To enable others skilled in the art to make and use my invention, I will proceed to describe the same with reference to the drawings.

A represents the seed-box, which is provided with an agitating-bar, B, the ends of which pass through the ends of the seed-box. This bar is provided with agitators C, which stir the seed and cause it to pass between the notches *m* into the seed-box. Below the bar B is another bar, D, which is supported by means of bent pieces F and provided with stirrers E, which as the bar is vibrated cause the seed to pass freely through the passage, G, and thence to drop to the ground. In the sowing-machines of the kind used heretofore the seed lies in the seed-box, resting with its full weight on the seed-bar, thereby causing a considerable degree of friction, and sometimes clogging up the spaces in the bearings of said seed-bar and arresting its motion. To prevent this I provide my seed-box with a false bottom, consisting of two separate shields, H, which are provided at their edges with notches *m*, and are hinged to the sides of the seed-box by means of hinges *a;* and the seed to be sown rests on the false bottom, and as the seed is agitated it is caused to freely pass into the seed-box and to drop to the bottom thereof, leaving both agitating-bars, B and D, clear of seed and not liable to become clogged in their bearings. The quantity of seed to pass through the passages G can be regulated by means of the sliding bottom K, which is provided at both its ends with grooves *b*, into which pass the tongues of corresponding plates L; and by turning lever M on its fulcra *d* the bottom K can be moved forward and backward, thereby increasing or diminishing the area of the passages G by reason of their tapering form.

The operation of this machine is as follows: A vibrating motion being imparted to shaft N by means of lever O, the arm *h* of said lever being attached to bar B, and arm *k* bearing against corresponding projections on bar D, the two bars are vibrated in opposite directions, and the agitators C cause the seed to pass between the notches *m* and drop to the bottom of the seed-box, where it is operated upon by the stirrers E, which cause it to pass through the passages G, and thence to drop to the ground.

Having thus fully described the nature of my invention, what I claim therein as new, and desire to secure by Letters Patent, is—

In combination with the adjustable bottom K and its openings G and the stirrers D B, the secondary hinged bottom, composed of the two pieces H H, with their openings *m*, the whole being combined in manner and for the purpose set forth.

A. C. MILLER.

Witnesses:
F. W. CARRACO,
JOHN H. SMITH.